United States Patent
Huang

Patent Number: 6,052,741
Date of Patent: Apr. 18, 2000

[54] METHOD FOR ACCURATELY FETCHING A SCSI DEVICE ID BY SAMPLING THE DEVICE TO OBTAIN SAMPLING VALUES AND CHOOSING A SAMPLING VALUE THAT APPEARS MOST FREQUENTLY

[75] Inventor: Yin-Chun Huang, Hsinchu, Taiwan

[73] Assignee: Umax Data Systems, Inc., Taiwan

[21] Appl. No.: 08/967,977

[22] Filed: Nov. 12, 1997

[51] Int. Cl.⁷ .......................... G06F 9/445; G06F 13/00
[52] U.S. Cl. ................... 710/8; 710/10; 713/1; 713/2
[58] Field of Search .................. 714/797; 713/1, 713/2, 100; 710/8, 10; 709/301; 324/457; 395/651, 652, 653, 828, 830, 681

[56] References Cited

U.S. PATENT DOCUMENTS

| | | | |
|---|---|---|---|
| 4,132,975 | 1/1979 | Koike | 714/797 |
| 5,794,032 | 8/1998 | Leyda | 713/2 |
| 5,867,730 | 2/1999 | Leyda | 710/10 |

FOREIGN PATENT DOCUMENTS

| | | |
|---|---|---|
| 56-117442 | 9/1981 | Japan . |
| 60-100273 | 6/1985 | Japan . |

OTHER PUBLICATIONS

Hewlett–Packard, scsictl(1M), HP–UX Reference—vol. 3: Section 1M (Palo Alto Ca: Hewlett–Packard, 1992), Aug. 1992.

Primary Examiner—Thomas C. Lee
Assistant Examiner—Tanh Quang Nguyen
Attorney, Agent, or Firm—Pillsbury Madison & Sutro LLP

[57] ABSTRACT

The present invention discloses a method for fetching the identifications of the SCSI (Small Computer Systems Interface) equipment even under the circumstances interrupted by ESD (Electro-Static Discharge). The fetch method samples the identification of an SCSI equipment plurality times, and then performs a classification scheme to those sampling values to search the sampling value that is most frequently appeared. The most frequently appeared sampling value is then treated as the identification of the SCSI equipment.

4 Claims, 3 Drawing Sheets

| level | testing voltage (KV) | the first peak current of discharging (A) (±10%) | rise time (ns) (with discharge swithes) | current at 30ns (A) (±30%) | current at 60ns (A) (±30%) |
|---|---|---|---|---|---|
| 1 | 2 | 7.5 | 0.7 to 1 | 4 | 2 |
| 2 | 4 | 15 | 0.7 to 1 | 8 | 4 |
| 3 | 6 | 22.5 | 0.7 to 1 | 12 | 6 |
| 4 | 8 | 30 | 0.7 to 1 | 16 | 8 |

FIG.3

METHOD FOR ACCURATELY FETCHING A SCSI DEVICE ID BY SAMPLING THE DEVICE TO OBTAIN SAMPLING VALUES AND CHOOSING A SAMPLING VALUE THAT APPEARS MOST FREQUENTLY

BACKGROUND OF THE INVENTION

1. Field of the Invention

The present invention relates to a fetching method, and more particularly, to a fetching method for accurately fetching the identifications of the SCSI (Small Computer Systems Interface) equipment even under the circumstances interrupted by ESD (Electro-Static Discharge).

2. Description of the Prior Art

Nowadays, there are many computer equipment such as hard disks and CD-ROMs (Compact Disk Read Only Memory) following the SCSI standard. However, each of the SCSI equipment needs a unique identification for recognizing and fetching their information in a computer system.

There usually appears unexpected ESD (Electro-Static Discharge) in the natural world, which usually generates large momentary current. FIG. 2 illustrates the relationship between time and the momentary current caused by the ESD, and the FIG. 3 lists four ESD levels of the momentary currents. It is obvious that the momentary current will rise to the first peak in a range about 0.7 to 1.0 ns (Nano second) whatever its level is, and the momentary current falls down as time passing. For example, an ESD with 4 KV (Kilo Volt) will generate a momentary current with the first peak of about 15 amperes (point A in the FIG. 2). Furthermore, when the time interval starts from the ESD appearance moment to 30 ns (point B in the FIG. 2) and 60 ns (point C in the FIG. 2) later, the momentary current falls down to 8 and 4 amperes, respectively. Please note that the momentary current increases as the voltage of the ESD becomes large.

Those sensitive computer systems are usually interrupted by the ESD, and thus cause unexpected failures. For example, while the computer system fetches the identification of SCSI equipment, a wrong SCSI identification may be fetched under the situation influenced by the ESD. To overcome this disadvantage, a conventional scheme is to apply a shield to cover the SCSI equipment and therefore redirects the momentary current to a proper place (e.g., to ground). Unfortunately, the shield can not always prevent the SCSI equipment from influencing by the ESD especially when the shield is broken. A requirement has been arisen to disclose a method for accurately fetching the identification of the SCSI equipment anytime.

SUMMARY OF THE INVENTION

The principal object of the invention is to provide a method for accurately fetching the identification of the SCSI equipment without influenced by the ESD.

According to the above-mentioned object, the invention discloses a method that samples the identification of the SCSI equipment plurality times to obtain sampling values. A classification scheme is then applied to find the sampling value that is most frequently appeared. The most frequently appeared sampling value is then treated as the identification of the SCSI equipment.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 describes a list illustrative of momentary currents according to four ESD levels.

DESCRIPTION OF THE PREFERRED EMBODIMENT

Figure 1:
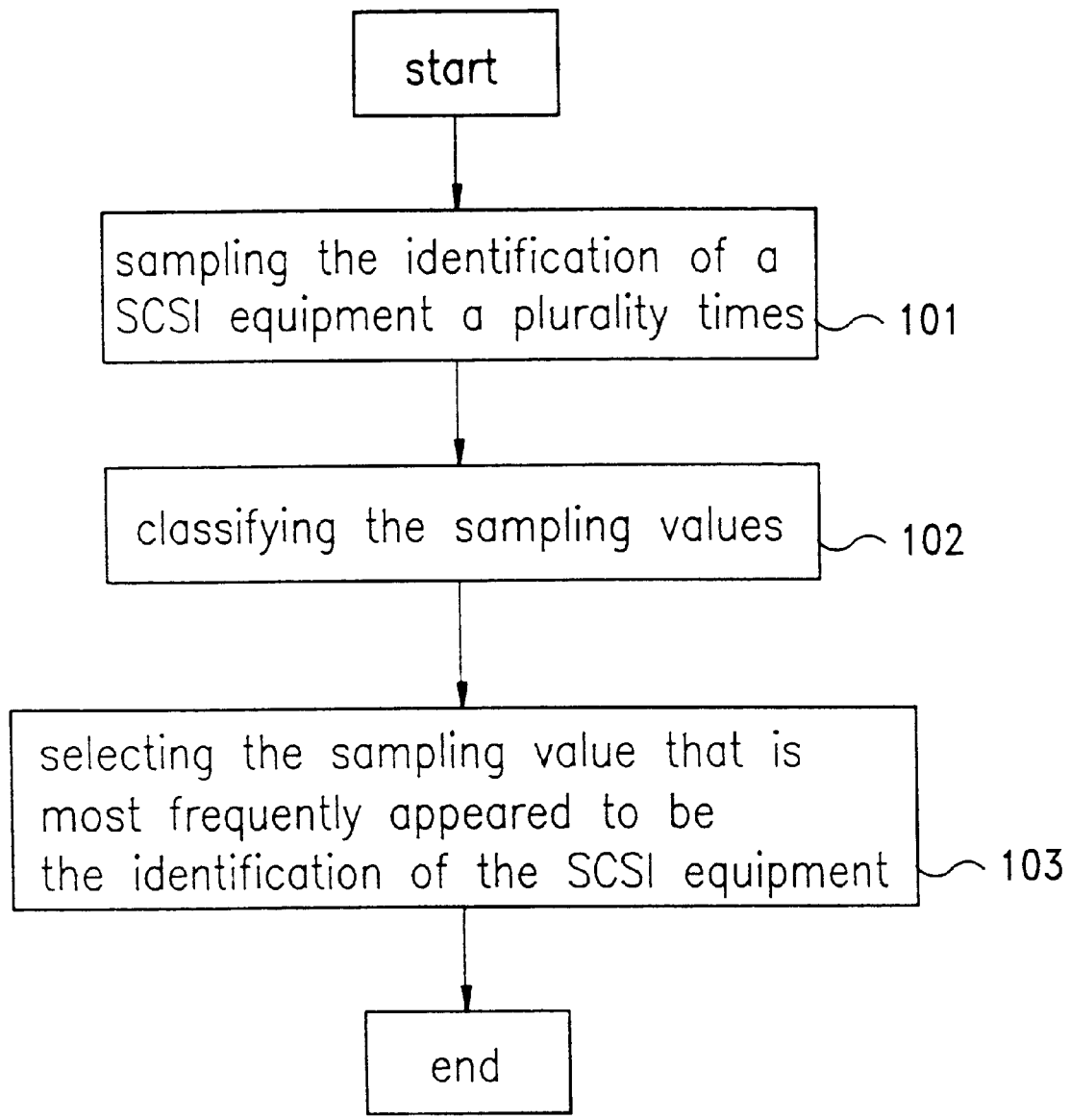
FIG. 1 represents the operations of fetching the identification of the SCSI equipment according to the invention.
Figure 2:
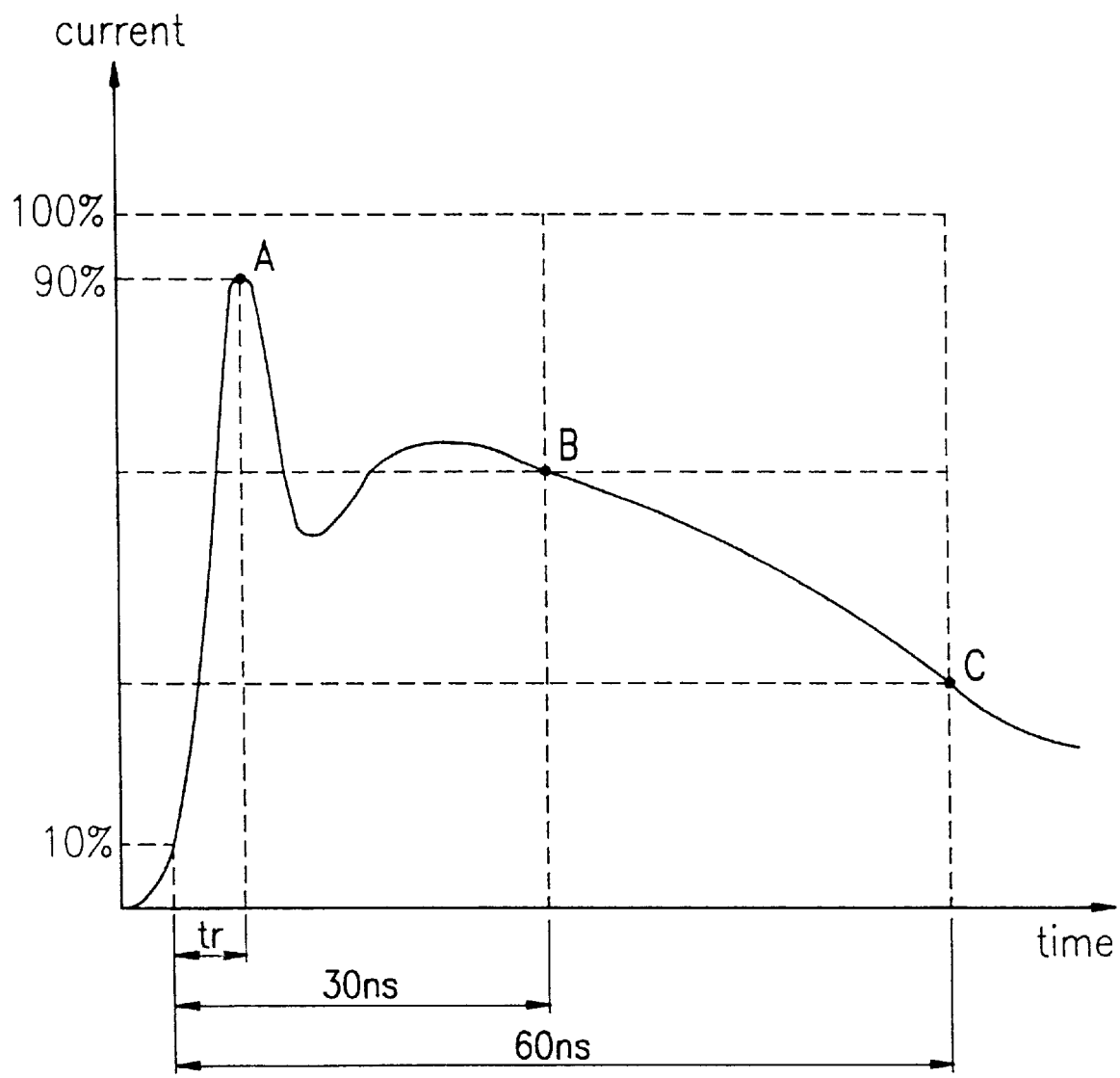
FIG. 2 illustrates the relationship between the time and the momentary current caused by the ESD.

The FIG. 1 illustrates the operations of fetching the identification of the SCSI equipment. When the computer system fetches the identification, it samples the SCSI identification plurality times to obtain a lot of sample values (block 101). A classification scheme is then applied to find the sample value that most frequently appears (block 102). This most frequently appeared sampling value is then treated as the identification of the SCSI equipment (block 103).

For example, when the computer system fetches the SCSI hard disk having SCSI identification 1 by sampling 10 times and under a period of 30 ns, assume the sampling values are '1, 1, 4, 4, 3, 1, 1, 1, 1, 1' in the block 101. After classifying in the block 102, the 'SCSI identification 1' appears 7 times, the 'SCSI identification 4' appears 2 times, and the 'SCSI identification 3' appears 1 time. The most frequently appeared 'SCSI identification 1' is then treated as the identification of the SCSI hard disk in the block 103. If the identification of the SCSI hard disk is fetched only once just as the conventional is, it is obvious that a wrong SCSI identification may be obtained (e.g., 3 or 4), and which usually breaks down the computer system. Obviously, the computer system will not fetch the wrong SCSI identifications even the SCSI equipment is not covered by a shield.

Please note that the fetching times and period can be modified in accordance with applications. However, at least 3 fetching times are needed for classification evaluations. When a different sample value appears in those 3 samples, the other sample value will be the SCSI identification. For example, the 3 samples are '4 1 1', and the SCSI identification will be 1. Unfortunately, those 3 samples should contain different values, such as '4, 3, 1'. It is hard to decide which sample value is the SCSI identification. Therefore, at least 60 ns of sampling frequency and 3 times are required to obtain an acceptable result through experiments.

Traditional counters or buffers can be applied to store the appearing times of the sample values, then follows by conventional classifying scheme to find the sample value that most frequently appeared. The fetching method can be implemented by using a software program, or a by hardware such as ROM (Read Only Memory), EPROM (Erasable Programmable Read Only Memory), and EEPROM (Electrically Erasable Programmable Read Only Memory).

In conclusion, the present invention discloses a method for accurately fetching the identifications of SCSI equipment. A sampling scheme is performed to sample the SCSI identification plurality times, and then performs a classification scheme to search the sampling value that is most frequently appeared. The most frequently appeared sampling value is then treated as the identification of the SCSI equipment. The computer system can prevent itself from fetching wrong identifications even the SCSI equipment is not covered by a shield, or covered by a broken shield.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for fetching an identification of a SCSI (Small Computer System Interface) device, comprising:

sampling the SCSI device to obtain a plurality of sampling values, the sampling taking place during a period of at least 60 nano seconds; and choosing a sampling value that most frequently appears among said sampling values to be the identification of said SCSI device.

2. The fetching method according to claim 1, wherein said sampling values are sampled at lease three times.

3. A method for fetching an identification of a SCSI (Small Computer System Interface) device, said fetching method accurately fetching said identification even under the circumstances interrupted by ESD (Electro-Static Discharge), wherein said fetching method comprises:

sampling said SCSI device to obtain at least three sampling values the sampling taking place during a period of at least 60 nano seconds, and choosing a sampling value that most frequently appears among said sampling values to be said identification of said SCSI device.

4. The fetching method according to claim 3, wherein said plurality of sampling values are sampled at least three times.

* * * * *